United States Patent
Kopeika et al.

(10) Patent No.: US 11,099,126 B2
(45) Date of Patent: Aug. 24, 2021

(54) UPCONVERSION SYSTEM COMPRISING A GLOW DISCHARGE DEVICE (GDD) FOR IMAGING AND COMMUNICATION

(71) Applicants: B. G. NEGEV TECHNOLOGIES AND APPLICATIONS LTD., AT BEN-GURION UNIVERSITY, Beer Sheva (IL); ARIEL SCIENTIFIC INNOVATIONS LTD., Ariel (IL)

(72) Inventors: Natan Kopeika, Beer Sheva (IL); Amir Abramovich, Herzelia (IL); Yitzhak Yitzhaky, Beer Sheva (IL); Avihai Aharon, Petch Tikva (IL); Daniel Rozban, Yehud (IL)

(73) Assignees: B. G. NEGEV TECHNOLOGIES AND APPLICATIONS LTD., AT BEN-GURION UNIVERSITY, Beer Sheva (IL); ARIEL SCIENTIFIC INNOVATIONS LTD., Ariel (IL)

( * ) Notice: Subject to any disclaimer, the term of this patent is extended or adjusted under 35 U.S.C. 154(b) by 0 days.

(21) Appl. No.: 16/318,427

(22) PCT Filed: Jul. 17, 2017

(86) PCT No.: PCT/IL2017/050805
§ 371 (c)(1),
(2) Date: Jan. 17, 2019

(87) PCT Pub. No.: WO2018/015949
PCT Pub. Date: Jan. 25, 2018

(65) Prior Publication Data
US 2019/0293751 A1    Sep. 26, 2019

Related U.S. Application Data

(60) Provisional application No. 62/363,269, filed on Jul. 17, 2016.

(51) Int. Cl.
*G01J 3/42* (2006.01)
*G01N 21/3581* (2014.01)
(Continued)

(52) U.S. Cl.
CPC ............ *G01N 21/3586* (2013.01); *G01J 3/42* (2013.01); *G01N 21/3581* (2013.01); *G01S 7/03* (2013.01);
(Continued)

(58) Field of Classification Search
CPC .... G01N 21/3581; G01N 21/3586; G01J 3/42
(Continued)

(56) References Cited

U.S. PATENT DOCUMENTS 2,673,343 A   3/1954 Rines
3,790,895 A * 2/1974 Farhat .................... H01J 17/40
                                                    329/355

(Continued)

FOREIGN PATENT DOCUMENTS

CN    102832289 A   12/2012
JP    201403214 A    2/2014

OTHER PUBLICATIONS

Kamil Cinar, Hakan Altan, and A. B. Sahin, "THz transmission and detection through glow discharge detectors," Terahertz Physics, Devices, and Systems VII: Advanced Applications in Industry and Defense, edited by Mehdi F. Anwar, Thomas W. Crowe, Tariq Manzur, Proc. of SPIE vol. 8716, 87160J (2013).*

(Continued)

*Primary Examiner* — Allen C. Ho
(74) *Attorney, Agent, or Firm* — The Roy Gross Law Firm, LLC; Roy Gross

(57) ABSTRACT

An upconversion system, including: a glow discharge device (GDD) configured to detect signal source radiation, wherein the signal source radiation is at least one of millimeter wave
(Continued)

(MMW) radiation and Terahertz (THz) radiation; and a photodetector configured to measure intensity changes in visible light emitted by said GDD as a result of absorption of the signal source radiation. The upconversion system optionally includes a processor operatively coupled to the photodetector. The processor is configured to analyze imagery captured by the photodetector, and to compute at least one parameter of the signal source radiation based on the imagery.

8 Claims, 9 Drawing Sheets

(51) Int. Cl.
| | |
|---|---|
| G01N 21/3586 | (2014.01) |
| G01S 7/03 | (2006.01) |
| G01S 13/34 | (2006.01) |
| G01S 13/89 | (2006.01) |
| H04N 5/30 | (2006.01) |
| H01J 47/00 | (2006.01) |

(52) U.S. Cl.
CPC .............. *G01S 13/34* (2013.01); *G01S 13/89* (2013.01); *H01J 47/00* (2013.01); *H04N 5/30* (2013.01)

(58) Field of Classification Search
USPC ....................................................... 250/336.1
See application file for complete search history.

(56) References Cited

U.S. PATENT DOCUMENTS

| | | | | |
|---|---|---|---|---|
| 5,033,114 A * | 7/1991 | Jayaraman | ............ | H04B 10/504 372/28 |
| 5,086,226 A * | 2/1992 | Marcus | ................. | G01N 21/67 250/281 |
| 5,610,477 A * | 3/1997 | Ivanov | .................... | H01J 17/30 313/234 |
| 6,852,969 B2 * | 2/2005 | Marcus | ................. | G01N 21/69 250/288 |
| 7,343,779 B1 * | 3/2008 | Yu | .......................... | G01N 30/08 422/89 |
| 7,615,933 B2 * | 11/2009 | Hooke | .................. | A61L 2/0011 315/209 R |
| 7,781,736 B2 * | 8/2010 | Logan, Jr. | .......... | G01N 21/3581 250/339.07 |
| 7,986,397 B1 | 7/2011 | Tiemann et al. | | |
| 8,129,684 B2 * | 3/2012 | Mueller | ................ | G01S 13/887 250/341.8 |
| 2013/0256535 A1 * | 10/2013 | Meijer | ...................... | G01J 3/42 250/340 |

OTHER PUBLICATIONS

Lei Hou, Hongkyu Park, and Xi-Cheng Zhang, "Terahertz Wave Imaging System Based on Glow Discharge Detector," IEEE Journal of Selected Topics in Quantum Electronics, vol. 17, No. 1, 177-182, Jan./Feb. 2011.*
Amir Abramovich et al., Upconversion of millimeter waves to visible waves: inexpensive focal plane array MMW imaging and ultra-fast MMW wireless communication, Proceedings of SPIE, vol. 11499, Terahertz Emitters, Receivers, and Applications XI, 2020.*
Cemre Kusoglu-Sarikaya et al., Understanding the effect of THz/mm wave-plasma interaction on the brightness of glow discharge detectors, Proceedings, vol. 11164, Millimetre Wave and Terahertz Sensors and Technology XII, 2019.*
Avihai Aharon et al., Ultra-wideband and inexpensive glow discharge detector for millimeter-wave wireless communication based on upconversion to visual light, Applied Optics, vol. 58, No. 22, p. F26-F31, Aug. 2019.*
Aviv Golan et al., Digital Signal Detection by a Glow Discharge Detector, IEEE Transactions on Plasma Science, vol. 47, No. 1, pp. 95-99, Jan. 2019.*
An English translation of JP2014-32144A by Patent Translate.*
The Zettabyte Era: Trends and Analysis, White Paper, Cisco, May 2015.
Kümer, T, et al, "Towards THz communications—status in research, standardization and regulation", JJournal of Infrared, Millimeter, and Terahertz Waves, Jan. 2014, vol. 35, issue 1, pp. 53-62.
Niu, Y. et al, "A survey of millimeter wave communications (mmWave) for 5G: opportunities and challenges", Wireless Networks, Nov. 2015, vol. 21, Issue8, pp. 2657-2676.
Nagatsuma, T. et al. "Terahertz wireless communications based on photonics technologies". Opt Express 21, 477-487 (2013).
A. Rogalski and F. Sizov, "Terahertz detectors and focal plane arrays", Opto-Electron. Rev. 19(3), 346-404 (2011).
A. Abramovich, N.S Kopeika, D.Rozban , E.Farber, "Inexpensive detector for terahertz imaging", Applied Optics, vol. 46, No. 29, pp. 7207-7211, (Oct. 2007).
D. Rozban, A. Levanon, H. Joseph, A. Akram, A. Abramovich, N.S. Kopeika, Y. Yitzhaky, A. Belenky, and O. Yadid-Pecht, "Inexpensive THz focal plane array imaging using neon indicator lamps as detectors", IEEE Sensors J., 1962-1968 (2011).
D. Rozban, A. Aharon (Akram), N. S. Kopeika A. Abramovich, "W-Band Chirp Radar Mock-Up Using a Glow Discharge Detector," IEEE Sensors J. 13(1), 139-145 (2013).
A. Abramovich, N.S Kopeika, D.Rozban , E.Farber, "Terahertz detection mechanism of inexpensive sensitive glow discharge detector" J. Appl. Phys., vol. 103, pp. 093306-1-093306-4, May 1, 2008.
Avihai Aharon (Akram), Daniel Rozban, Natan S. Kopeika, and Amir Abramovich, "Heterodyne detection at 300 GHz using neon indicator lamp glow discharge detector", Applied Optics vol. 52, Iss. 17, pp. 4077-4082 (2013).
A. Levanon, D.Rozban, A.Aharon (Akram), N.S. Kopeika, Y. Yitzhaky, and A. Abramovich, "Capability of long distance 100 GHz FMCW using a single GDD lamp sensor", Applied Optics, vol. 53, Issue 36, pp. 8549-8555, 2014.
Avihai Aharon (Akram), Daniel Rozban, Avi Klein1 , Amir Abramovich , Yitzhak Yitzhaky, and Natan S. Kopeika, "Detection and upconversion of three-dimensional MMW/THz images to the visible", Photonics Research, vol. 4 (6), pp. 306-312; Dec. 2016.
N. S. Kopeika, "On the mechanism of glow discharge detection of microwave and millimeter wave radiation," Proc. IEEE 63, 981-982 (1975).
13. L. Hou, W. Shi, "Fast Terahertz Continuous-Wave Detector Based on Weakly Ionized Plasma", IEEE Electron device letters J. 33(11), (2012).
Avihai-Aharon Akram, "Millimeter wave direct and heterodyne imaging using inexpensive focal plane arrays", Seminar Invitation, [summary of seminar held at Jun. 27, 2016] Avihai-Aharon Akram, Abstract.
Mikhail S. Gitlin et al, "Time-resolved imaging of millimeter waves using visible continuum from the positive column of a Cs—Xe dc discharge", Journal of Applied Physics 107(6):063301-063301-11 • Apr. 2010.
A. Abramovich, N. S. Kopeika, D. Rozban, A. Levanon, Moshe Shilemay, A. Akram, H. Joseph, O. Yadid-Pecht, and A. Belenky "Super resolution and optical properties of THz double row array based on inexpensive Glow Discharge Detector (GDD) pixels", Proc. SPIE 8188, Millimetre Wave and Terahertz Sensors and Technology IV, 81880A (Oct. 13, 2011).
Office Action issued by the Japanese Patent office dated Jul. 20, 2021.

* cited by examiner

UPCONVERSION SYSTEM COMPRISING A GLOW DISCHARGE DEVICE (GDD) FOR IMAGING AND COMMUNICATION

CROSS-REFERENCE TO RELATED APPLICATIONS

This application is a National Phase of PCT Patent Application No. PCT/IL2017/050805 titled "UPCONVERSION SYSTEM FOR IMAGING AND COMMUNICATION" having International filing date of Jul. 17, 2017, which claims the benefit of priority of U.S. Provisional Patent Application No. 62/363,269, filed Jul. 17, 20161. The contents of the above applications are all incorporated by reference as if fully set forth herein in its entirety.

FIELD OF THE INVENTION

The invention relates to the field of upconverting millimeter and terahertz waves to visible light.

BACKGROUND

The use of millimeter wave (MMW) and terahertz (THz) radiation has increased in recent years, especially in the field of spectroscopy and imaging. More and more applications in medicine, communications, homeland security, material science, and space technology are based on MMW and THz radiation bands.

Various detectors of distinct types are used in different industries. Bolometric and other thermal detectors may be quite sensitive but are slow, thus inhibiting real time video rate imaging of what is being scanned. Semiconductor detectors are very sensitive and very fast, but also very expensive. Glow discharge miniature neon indicator lamps, are inexpensive but are less sensitive than semiconductor detectors. However, glow discharge miniature neon indicator lamps may be noisy, but the internal electron amplification of a glow discharge device GDD compensates for this. The detection method in these detectors usually involves measuring change in current generated by an electric field of incident millimeter or terahertz waves.

In communications, data traffic is increasing exponentially, with Internet protocol traffic expected to reach over one hundred exabytes per month very soon. The increasing availability of online services encourages mobile users to use them and, therefore, the fastest growth of the data traffic increase is over wireless channels. These wireless channels include numerous connection links between each base station, between a base station and an end-user device, between each end-user device, and/or the like. Realization of communications between autonomous vehicles require MMW communication and huge data rates. For those links, a higher wireless transmission rate is required. To enable such an increase in the network capacity and huge wireless data rates, the carrier wave frequency is gradually increased to the MMW portion of the electromagnetic spectrum (30-300 GHz). Historically, for wireless communications, carrier frequencies that were used have been increasing to meet bandwidth requirements, up to the recent development of wider spectral bands at MMW frequencies, such as 60 GHz and around 70 GHz to 95 GHz and beyond.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, an upconversion system, comprising: a glow discharge device (GDD) configured to detect signal source radiation, wherein the signal source radiation is at least one of millimeter wave (MMW) radiation and Terahertz (THz) radiation; and, a photodetector configured to measure intensity changes in visible light emitted by said GDD as a result of absorption of the signal source radiation.

In certain embodiments, the upconversion system further comprises a radiation source configured to emit the signal source radiation towards an object, to be reflected by the object towards the GDD.

In certain embodiments, the upconversion system further comprises a beam splitter configured to split the signal source radiation into a signal beam and a reference beam, wherein the signal beam and reference beam are absorbed by the GDD to generate the visible light.

In certain embodiments, the radiation source is configured to modulate the frequency of the signal source radiation over time, such that a difference in the frequency indicates a distance of each pixel of an image of the GDD measured by the photodetector, enabling construction of a three-dimensional image of the object.

In certain embodiments, the radiation source is configured to modulate the amplitude modulation of the signal source radiation, to distinguish between visible light resulting from the signal source radiation and visible light resulting from a bias current supplied to the GDD.

In certain embodiments, the upconversion system further comprises a processor (150) operatively coupled to the photodetector, the processor configured to analyze imagery captured by the photodetector, and to compute at least one parameter of the signal source radiation based on the imagery.

In certain embodiments, the upconversion system is configured to operate as a wireless communication receiver.

There is provided, in accordance with an embodiment, a method comprising directing a photodetector towards a glow discharge device (GDD); and operating the photodetector to capture visible light emitted from the GDD as a result of the GDD absorbing at least one of millimeter wave (MMW) radiation and Terahertz (THz) radiation.

In certain embodiments, the method further comprises emitting the signal source radiation from a radiation source towards an object, to be reflected by the object towards the GDD.

In certain embodiments, the method further comprises modulating the frequency of the signal source radiation over time, such that a difference in the frequency indicates a distance of each pixel of an image of the GDD measured by the photodetector; and constructing a three-dimensional image of the object based on the indicated distance.

In certain embodiments, the method further comprises modulating the amplitude of the signal source radiation, to distinguish between visible light resulting from the signal source radiation and visible light resulting from a bias current supplied to the GDD.

In certain embodiments, the method further comprises using a beam splitter to split the signal source radiation into a signal beam and a reference beam, wherein the signal beam and reference beam are absorbed by the GDD to generate the visible light.

In certain embodiments, the method further comprises providing a processor that is operatively coupled to the photodetector; and operating the processor to analyze imagery captured by the photodetector, and to compute at least one parameter of the signal source radiation based on the imagery.

In certain embodiments, the method further comprises using the photodetector, the GDD, and the processor as a wireless communication receiver.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1A:
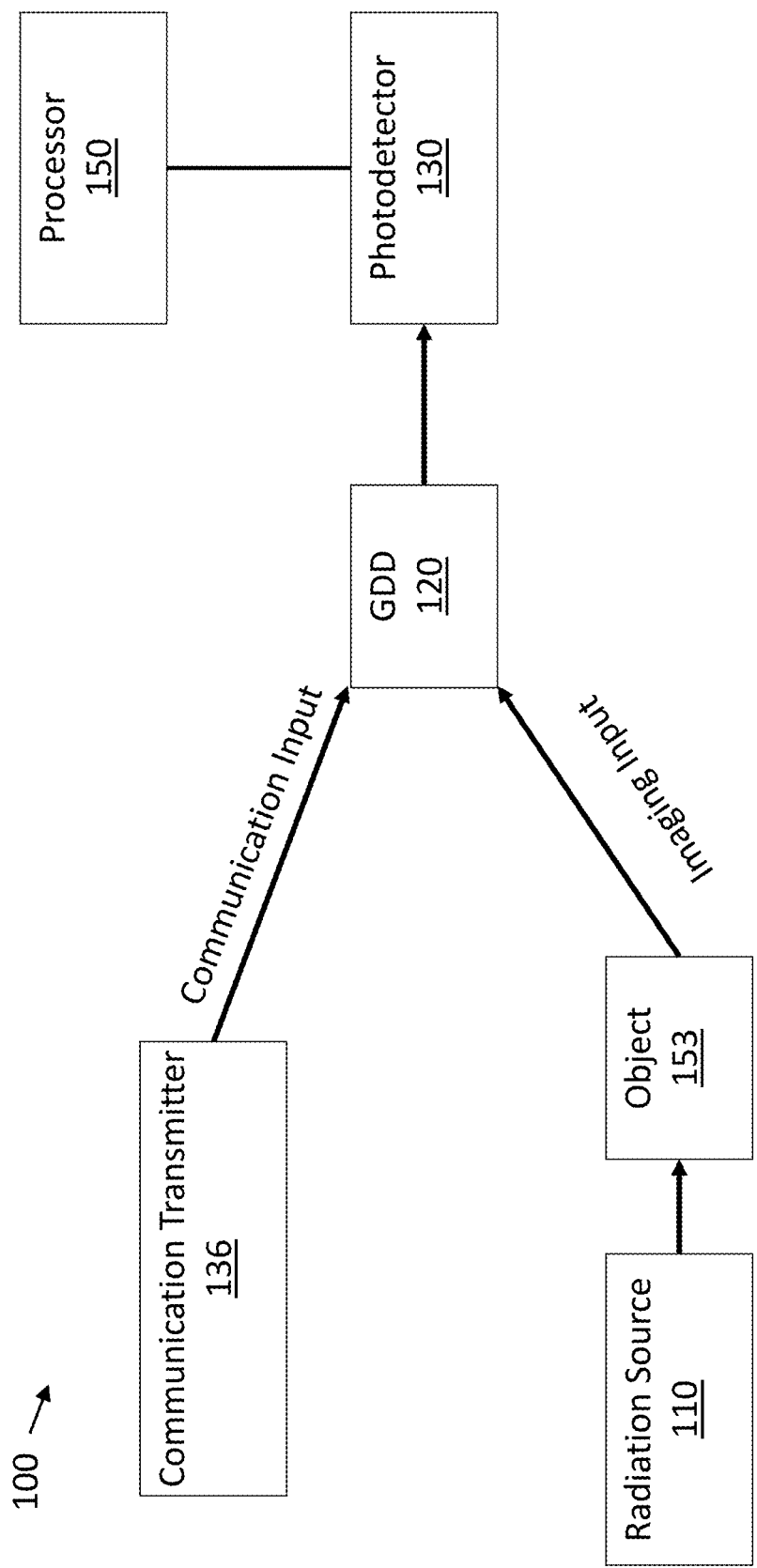
FIG. 1A-1E show an upconversion system, according to some exemplary embodiments of the subject matter.

Disclosed herein is a millimeter and terahertz wave detection system, that utilizes a glow discharge detector (GDD) in an unconventional way. Instead of reading the GDD's output electrically, as known in the art, the present system reads the GDD's output optically—by imaging the light emitted by the GDD as it senses millimeter and terahertz wave. Namely, the present detection system is based on upconversion of millimeter and terahertz waves into visible light. In some embodiments, however, electrical reading of the GDD's output complements the optical reading.

This upconversion system may be configured to operate in a variety of implementations, e.g. in wireless communication systems, imaging systems, or the like. When used in a wireless communication system, for example, the present detection system acts as a wireless receiver of MMW and/or THz signals. When used for imaging purposes, the detection system may also include a MMW and/or THz radiation emitter that irradiates a target; the system then receives and analyzes reflections from the target.

Optionally, the photodetector is a charge-couple device (CCD) or a complementary metal-oxide-semiconductor (CMOS) camera configured to capture an image of light emission from the GDD.

In certain embodiments, photodetector may be a focal plane array (FPA). The FPA may construct an image based on GDD pixels detected from the light emission. The image may be constructed according to the photodetector's measurements of the light emission emitted by the GDD. The image may provide an indication of the GDD's glow, which may be indicative of MMW/THz radiation incident on the GDD. In certain embodiments, such response from the visible wave captured by the CCD/CMOS camera may be greater than the value derived electronically by measuring a current output from the GDD.

In certain embodiments, a MMW/THz radiation may be a signal beam directed to a target object and reflected onto the GDD. A reference beam may be focused on the GDD. The GDD may mix both beams and a signal at a difference frequency may be emitted electronically by the GDD. In addition, the light emission of the GDD may be modulated at the difference frequency. Thus, the heterodyne signal may be upconverted to a visible light frequency. By chirping one beam so that its frequency changes with time, the difference frequency may be changed with time at the same rate, both electronically and optically. Thus, the difference frequency may indicate a distance for each GDD pixel. By measuring the difference frequency for each GDD absorption, a distance information at each pixel is determined, thus obtaining a three-dimensional image. This is known as frequency modulation continuous wave (FMCW) radar. The GDD light emission detected with a CCD/CMOS camera may provide a MMW/THz three-dimensional image upconverted to visible light, which is with an improved sensitivity and speed as compared to electronic detection of the GDD current output.

1. General System Description

FIG. 1A-1E show an upconversion system, according to some exemplary embodiments of the subject matter.

Referring to FIG. 1A showing an upconversion system 100. Upconversion system 100 may comprise a glow discharge detector (GDD) 120, which may be configured to detect MMW and/or THz wave radiation. Upconversion system 100 may comprise a photodetector 130, which may measure the visible light emitted from GDD 120. In certain embodiments, photodetector 130 may be a charge-couple device (CCD) or complementary metal-oxide-semiconductor (CMOS) camera configured to capture an image of the visible light emitted by GDD 120. GDD 120 may receive a communication input from a communication transmitter 136. Communication transmitter may transmit the communication input in MMW and/or THz radiation that may be detected by GDD 120 as further described herein in FIGS. 1B and 1E. GDD 120 may detect a light input. Light input may be MMW and/or THz radiation emitted by a radiation source 110 directed at an object 153 and may reflect off of object 153 towards GDD 120 as further described herein in FIG. 1C-1D.

A detection mechanism of GDD 120 may operate according to slight changes of a bias current between two electrodes of a lamp of GDD 120. The current change may occur due to the electric field of an electromagnetic radiation, e.g. MMW/THz radiation, being incident on GDD 120. The expression for change in bias current of GDD 120 due to MMW/THz radiation may be given by:

$$\Delta I(t) = \frac{G \cdot q^2 \cdot V \cdot n}{V_i \cdot m} \cdot \left(\frac{\tau}{\tau_i}\right) \cdot \eta_0 \cdot P_D \cdot \left(\frac{v}{v^2 + \omega^2}\right) \cdot (1 - e^{-\frac{t}{\tau}}) \quad (1)$$

where $$G \approx \frac{\exp(2 \cdot v_i \cdot t_d)}{2 \cdot v_i \cdot t_d}$$

may designate an internal signal amplification, q may be an electron charge, V may be an average electron velocity, n may be an electron density, $V_i$ may be a gas ionization potential, m may be an electron mass, τ may be a time response to create current changes, $τ_i$ may be a time between ionization collisions of electrons with gas atoms, $η_0$ may be a free space impedance, $P_D$ may be an incident MMW/THz radiation power density on the detector, v may be an electron-neutral atom elastic collision frequency, ω may be an electromagnetic radiation frequency, $t_d$ may be an average electron drift time to the anode, and $v_i$ may be an ionization collision frequency. A dominant mechanism may be an enhanced cascade ionization rather than diffusion current; the enhanced cascade ionization mechanism may increase a current while a diffusion current mechanism decreases it. Eq. (1) may be maximum when ω and v are equal. GDD 120 may be sensitive to the polarization of incident MMW/THz radiation. In certain embodiments, the MMW/THz radiation may require fast envelope detection. Examples of such applications may include measuring flight time, radar detection, direct detection of short pulses, real-time imaging or the like. A response time of the plasma inside GDD 120 may be on the order of picoseconds; however, the response time is limited by the electronic circuit to about 1 microsecond (μs).

The optical polarization sensitivity of GDD 120 may be configured in a side configuration, a head on configuration, or the like. A maximum detection value may be obtained when a DC electric field is in the direction of a MMW/THz electric field. A minimum detection value may be obtained when the DC electric field and the MMW/THz electric field are orthogonal to each other. The minimum detection value may be 30% of the maximum detection value. When MMW/THz frequencies are such that the wavelength is on the order of electrode geometry dimensions, absorption by the plasma and noticeable responsivity increases may occur.

A calculation of a system NEP of upconversion system 100 may be calculated using Eq. (2):

$$NEP = \frac{V_n}{R \cdot \sqrt{B}} = \frac{P_{s\_min}}{\sqrt{B}} \quad (2)$$

where $V_n$ may designate a noise voltage, $P_{s\_min}$ may designate a minimum detected signal power in direct detection, B may designate a bandwidth, and R may designate a responsivity of the detection system as described.

The noise voltage may be measured at about 130 nano-Volt (nV)/√Hz. The NEP of upconversion system 100 may be calculated to be about 1.3 nano-Watt (nW)/√Hz. The NEP using photodetector 130 may be an order of magnitude lower than the NEP using the electronic detection of GDD 120 that was measured to be about 10 nW/√Hz when the incident EM wave illuminated an entire side of GDD 120 instead of a narrow "head" of GDD 120.

2. Use in a Communication System

In certain embodiments, upconversion system 100 may be configured to operate in a wireless communication system. The fastest-growing communication is through wireless channels, as mobile users increasingly make use of online services. Such an increase in a network's capacity requires much higher wireless transmission rates in numerous connection links between each base station, between a base station and an end-user device, between each end-user device, and/or the like. To enable high wireless data rates, the carrier wave frequency may be increased to the MMW portion of the electromagnetic spectrum.

Figure 1B:
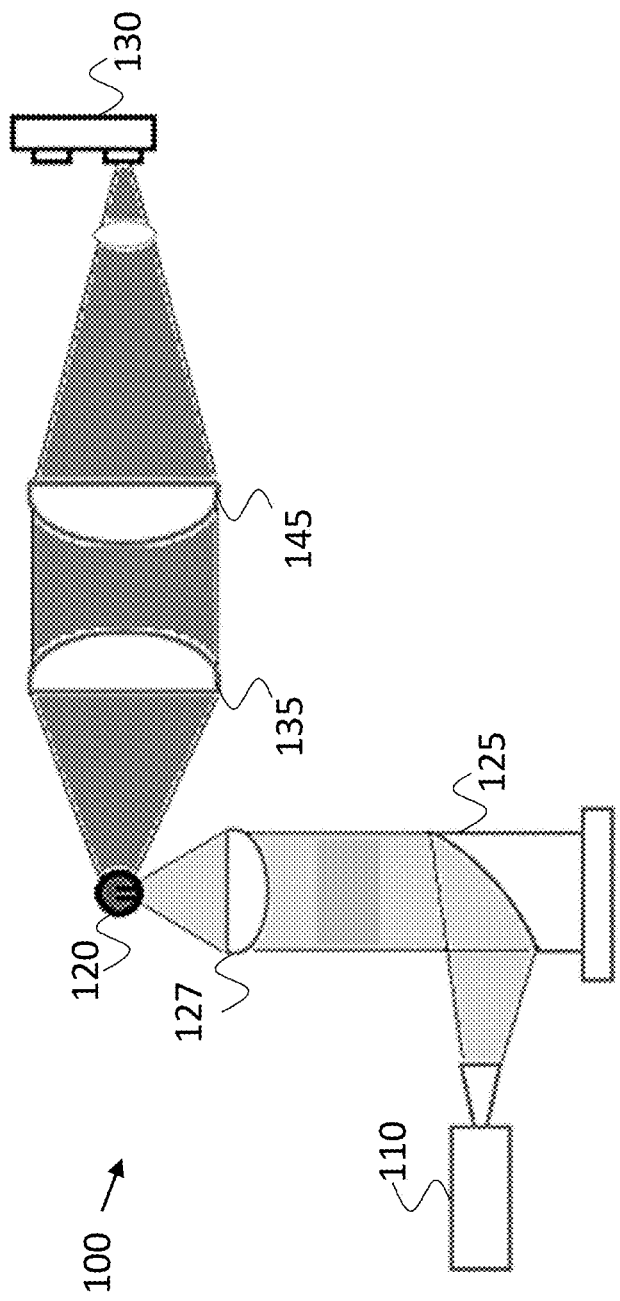

Referring to FIG. 1B showing upconversion system 100, according to certain embodiments. Upconversion system 100 may comprise an off axis parabolic mirror (OPM) 125 and a lens 127 configured to focus the radiation onto GDD 120, for example, across a GDD plasma cross section between electrodes of GDD 120. Lens 127 may be a polyethylene (PE) lens. Optionally, a first optical lens 135 and a second optical lens 145 may be configured between GDD 120 and photodetector 130 to direct the visible light emitted by GDD 120 to be accurately captured by photodetector 130.

Figure 1C:
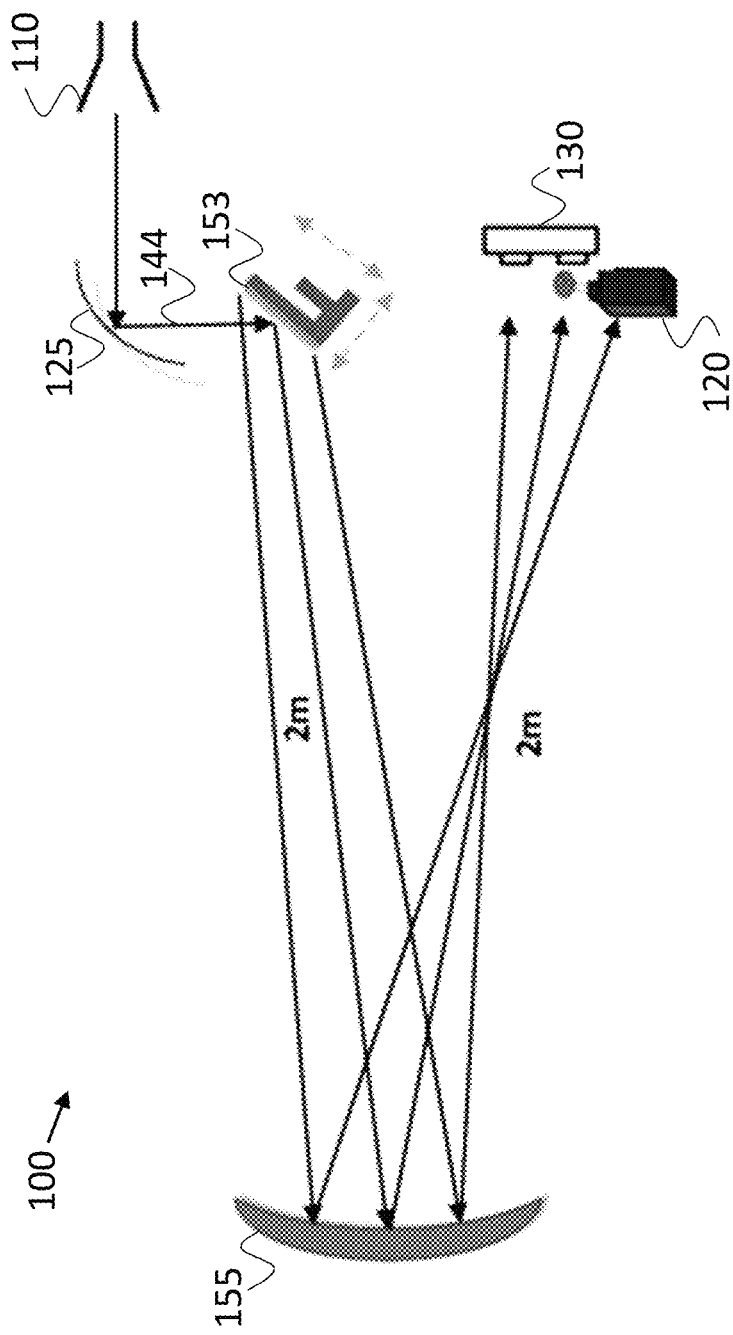
Figure 1D:
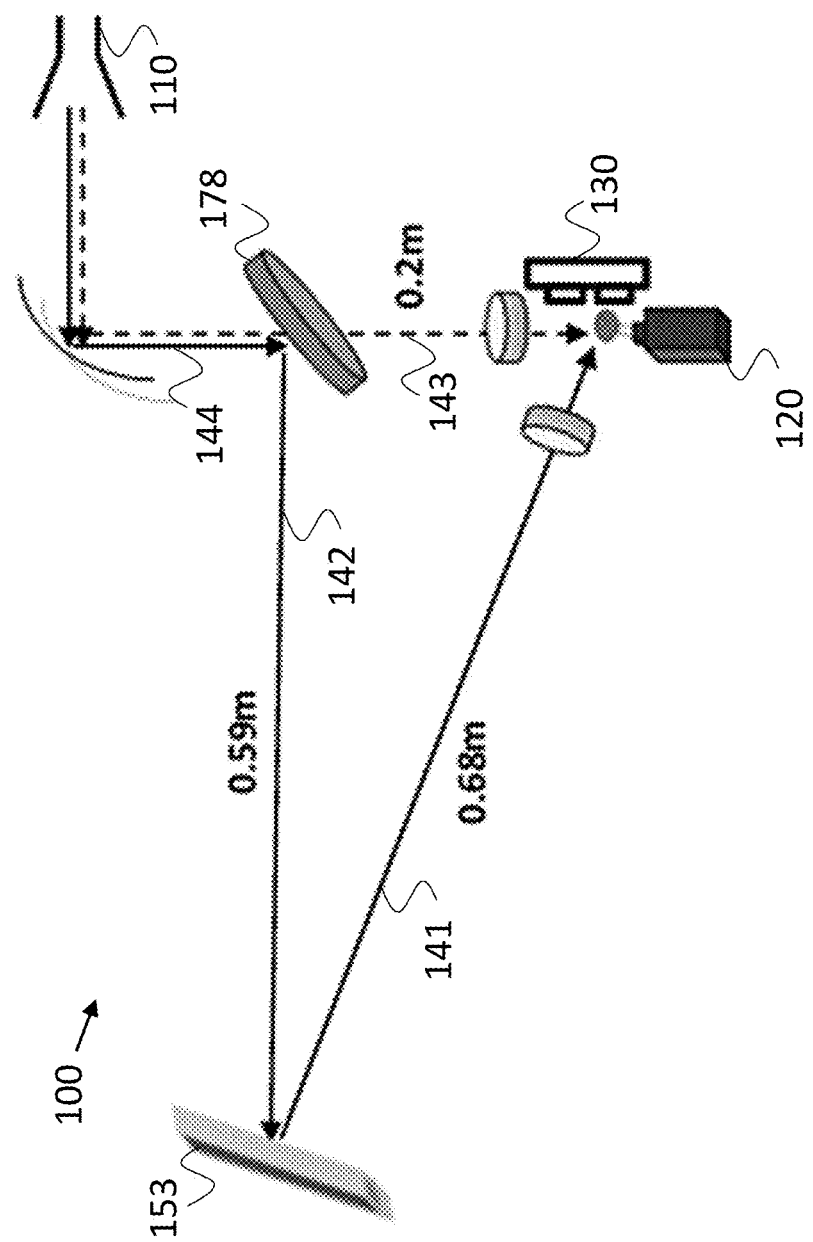
Figure 1E:
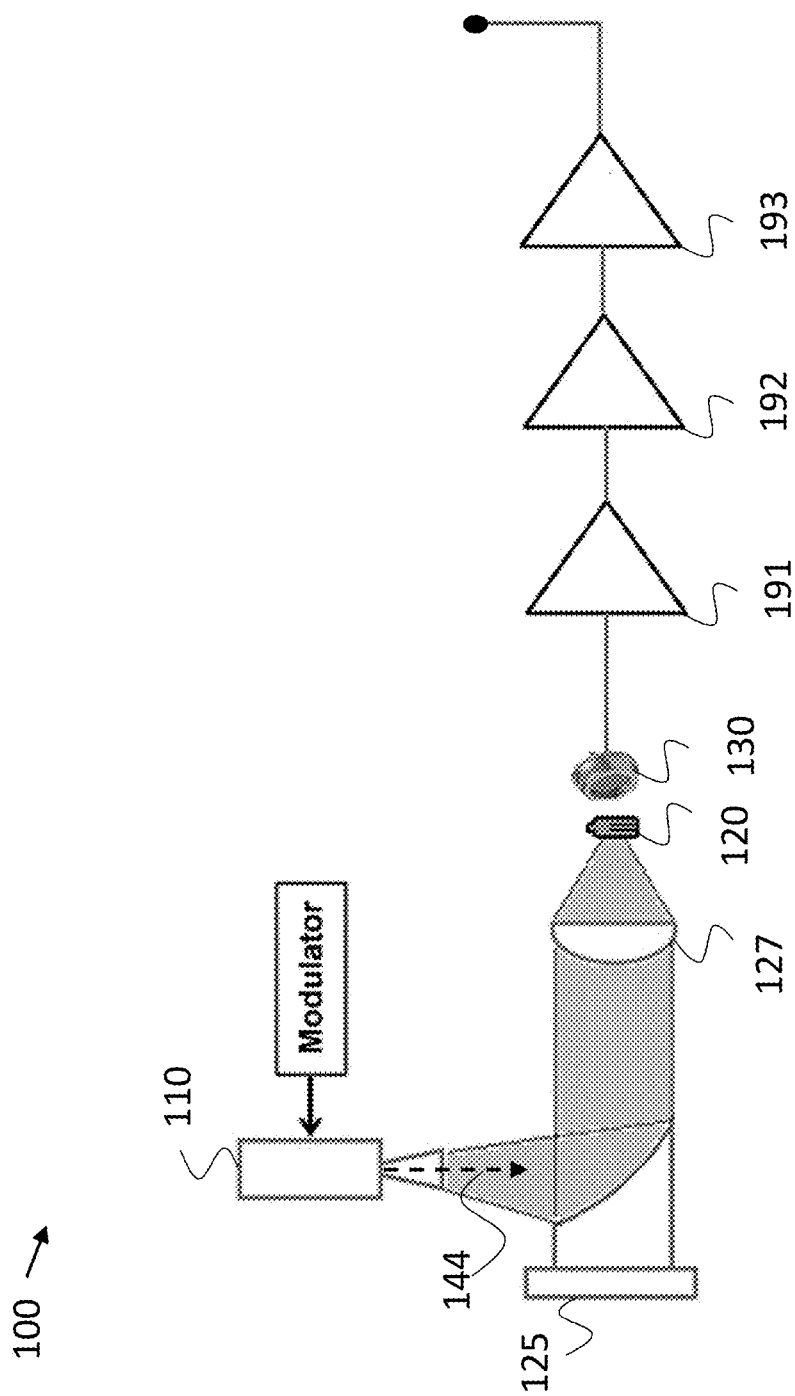

Referring to FIG. 1E, changes in light emission intensity by GDD 120 may be caused by the modulated MMW radiation. The light emission intensity may be measured by photodetector 130, which was placed adjacent to GDD 120. Photodetector 130 may be connected to an amplifying chain to filter data obtained by photodetector 130. The amplifying chain may comprise a trans-impedance amplifier (TIA) 191, an operational amplifier (AMP) 192, and a low noise amplifier (LNA). TIA 191 may have a limited bandwidth, which is used for impedance matching. LNA 193 may have an input impedance of 50 ohm as opposed to TIA 191, which may have high output impedance. In certain embodiments, radiation source 110 may be a base station transmitting a signal, e.g. communication data, in the form of radiation that may be received by GDD 120. In certain embodiments, TIA 191 may be coupled with an avalanche photodiode (not shown), which may be configured to increase the sensitivity and bit rate output of TIA 191. In certain embodiments, an impedence matching element may be coupled to the amplifying chain to improve the sensitivity and bit rate.

This signal may be obtained with a GDD bias current up to about 10 milli-Amp (Ma), e.g. within a range of 5-10 Ma, square-wave modulation at 12 MHz, and radiation source 110 may be configured as a MMW carrier frequency of 100 GHz. In GDD 120, after breaking down the plasma by the direct current bias current, the MMW radiation may increase de-excitation and recombination rates in the plasma and therefore increases the illumination intensity of GDD 120. Amplitude modulation of the MMW radiation, e.g. signal source radiation 144, may be required to distinguish between a signal light and a bias light of GDD 120. The signal light may be modulated while the bias light might not. Alternating current (AC) coupling may be used to separate an AC signal from a stronger DC bias. The DC voltage may form as a result of the GDD light without MMW radiation.

3. Use in an Imaging System

Referring to FIG. 1C, showing another embodiment of upconversion system 100, according to some exemplary embodiments of the subject matter. OPM 125 may be arranged along a radiation pathway between radiation source 110 and object 153. OPM 125 may be configured such that the radiation emitted towards object 153 is incident radiation, e.g. signal source radiation 144. The radiation reflecting from object 153 may travel towards a spherical mirror 155. The radiation reflecting from object 153 may travel in different angles relative to spherical mirror 155. The radiation reflecting from spherical mirror 155 travels toward GDD 120, which may receive the radiation reflected from object 153. Optionally, GDD 120 is placed in an image plane. Upon receiving the radiation traveling from spherical mirror 155, GDD 120 may emit visible light. The light reaching GDD 120 may have different intensity according to the angle at which the radiation reaches GDD 120. The visible light is captured by photodetector 130. Photodetector 130 may be arranged close to GDD 120 to detect a change of the intensity of the visible light emitted by GDD 120. In certain embodiments, GDD 120 may be a GDD focal point array (FPA), which may enable photodetector 130 to detect and simultaneously image the GDD pixels. The image may provide an indication of the GDD's glow, which may be indicative of MMW/THz radiation incident on GDD 120. Optionally, where GDD 120 does not function as a FPA, the image may be acquired by scanning object 153 horizontally and vertically in an object plane. A GDD visible light emission may be detected with photodetector 130, e.g. a CCD/CMOS camera, may provide a MMW/THz three-dimensional image upconverted to visible light.

Upconversion of the radiation into visual light via GDD 120, which may multiply the radiation from radiation source 110, e.g. low-frequency source to 100 GHz. A MMW/THz modulated signal may be coupled to free space by a conical horn antenna, which may produce an approximately fundamental mode Gaussian beam. The GDD's light may be directed toward photodetector 130.

Referring to FIG. 1D, showing upconversion system 100 utilizing a reference beam, according to certain embodiments. Upconversion system 100 may comprise a beam splitter 178. Upconversion system 100 may be configured as a Frequency-Modulated Continuous-Wave (FMCW) radar to provide frequency modulation at a signal source to enable propagation delay measurements for determination of the distance to the target or depth of an object in an imaging system. In certain embodiments, FMCW radar and signal source radiation 144 may be split into two beams via beam splitter 178. A first beam, e.g. signal beam 142, may be incident towards object 153 and reflected as a reflected signal beam 141 towards GDD 120. A second beam, e.g. reference beam 143, may be incident directly on the photodetector 130. Either signal beam 141 or reference beam 143 may be frequency modulated, e.g. chirped, so that the time difference in propagation ($\Delta_t$) for the signal beam and the reference beam may yield a beat frequency ($f_b$). That frequency may be constant and proportional to the distance from object 153 at each instant of image recording.

In certain embodiments, reference beam 143 may be focused on GDD 120. GDD 120 may receive and form an interference pattern of reflected signal beam 141 and reference beam 143, resulting in signal at a difference frequency that may be emitted optically by GDD 120. In addition, the light emission of GDD 120 may be modulated at the difference frequency. Thus, the heterodyne signal may be upconverted to visible light. By chirping one beam so that its frequency changes with time, the difference frequency may be changed with time at the same rate, both electronically and optically. Thus, the difference frequency may indicate a range for each GDD pixel. By measuring the difference frequency for each GDD absorption, a distance information at each pixel is determined, thus obtaining a three-dimensional image. This is known as frequency modulation continuous wave radar, e.g. FMCW radar. The GDD light emission detected with a CCD/CMOS camera may provide a MMW/THz three-dimensional image upconverted to visible light, which is with an improved sensitivity and speed as compared to electronic detection of the GDD current output. The resulting measurement by the photodetector may be implemented for use in wireless communications and imaging as further described below.

According to the beat frequency ($f_b$), a distance/range (R) of an object may be calculated to be:

$$f_b = f_{SR} \cdot \Delta t = \frac{\Delta f}{T_s} \cdot \frac{2R}{c} \Rightarrow R = \frac{f_b \cdot T_s \cdot c}{2\Delta f} \quad (3)$$

where $f_{SR}$ may designate a sweep rate, e.g. chirp slope, $\Delta f$ may designate a full frequency swing, e.g. chirp bandwidth, R may designate the optical path difference (OPD) between the signal and the reference beams, $T_s$ may designate a chirp sweep time, and c may designate the speed of light.

The depth resolution may be designated as $\delta R$ and may be calculated according to (3). Using a beat frequency resolution $\delta f_b$, the minimum resolvable frequency deviation is $\delta f_b \approx 1/T_s$. Therefore, the depth resolution may be written as:

$$\delta R = \frac{c}{2\Delta f} \quad (4)$$

where $\delta R$ may be a minimum recognizable image depth (depth resolution). Thus, the larger a frequency swing, the better the depth resolution that may be achieved.

In certain embodiments, high-power microwave source radiation may produce visible light in a lamp of GDD 130. The range of illumination in the lamp over a lamp array may depend on a microwave intensity. Thus, a microwave distribution may be captured by photodetector 130. GDD 120 may emit light that may be analyzed to generate pixels in an imaging system. In certain embodiments, MMW imaging technique may utilize visible light emitted from the positive column of a Cs-Xe DC discharge. MMW radiation may be incident towards a large uniform positive column window of GDD 130 and may result in changes in a positive column light intensity. In certain embodiments, a minimum detectable MMW power density of upconversion system 100 may be on the order of 1 Watt per centimeters squared for 35 GHz radiation, with a response time about 0.8 µs, and a spatial resolution for time slot of 10 microseconds was 3 mm.

4. Experimental Results

As experimental results have shown, the responsivity of upconversion system 100 may be calculated by measuring an input MMW/THz power on a GDD cross section, as well as an output signal voltage from photodetector 110. A MMW/THz pyroelectric array camera (not shown) was configured to measure and calculate the input MMW/THz power. A MMW/THz absolute power meter was configured to measure a beam power. The total MMW/THz radiation power incident on the GDD cross section was calculated to be 800 µW. The detected signal from the photodetector output was 76 mV, which results in a responsivity of 95 Volt/Watt for the detection system at 100 GHz with GDD bias current of 10 milli-Amp. For comparison, the detected signal from the electronic circuit (without an amplifier) was measured to be 25 Megavolt (Mv), which results in responsivity of 31 V/W for the electronic detection system at 100 GHz with the same GDD bias current. The optical upconversion was thus more responsive than the electronic detection.

The path length was 0.55 meters (m). Signal source radiation 144 was directed by beam splitter 178 toward object 153, which was a planar metal mirror. Reflected signal beam 141 by object 153 was focused onto GDD 120 via lens 127. The path length was 1.62 m. The path between a reference beam 143 and signal beam 142 was 1.07 m. As a result of heterodyne detection by GDD 120, a difference frequency, e.g. the beat frequency—$f_b$, was obtained proportional to the OPD of reflected signal beam 141 and reflected beam 143, e.g. R.

A chirp bandwidth was about $\Delta f=3$ GHz at an output of the MMW/THz source, e.g. radiation source 110, with chirp sweep time $T_s$ of 0.9 milli-seconds (ms) (the modulation signal was a 1 kHz saw-tooth signal with duty cycle of 90%) provided a chirp rate of $f_{SR}=3$ MHz/µs, a beat frequency resolution of $\delta fb=1$ KHz, and OPD resolution, for scenarios where there is no round trip path, of 0.1 m (the range resolution ($\delta R$), for scenarios where there is no round trip path, is 0.05 m).

Figure 3:
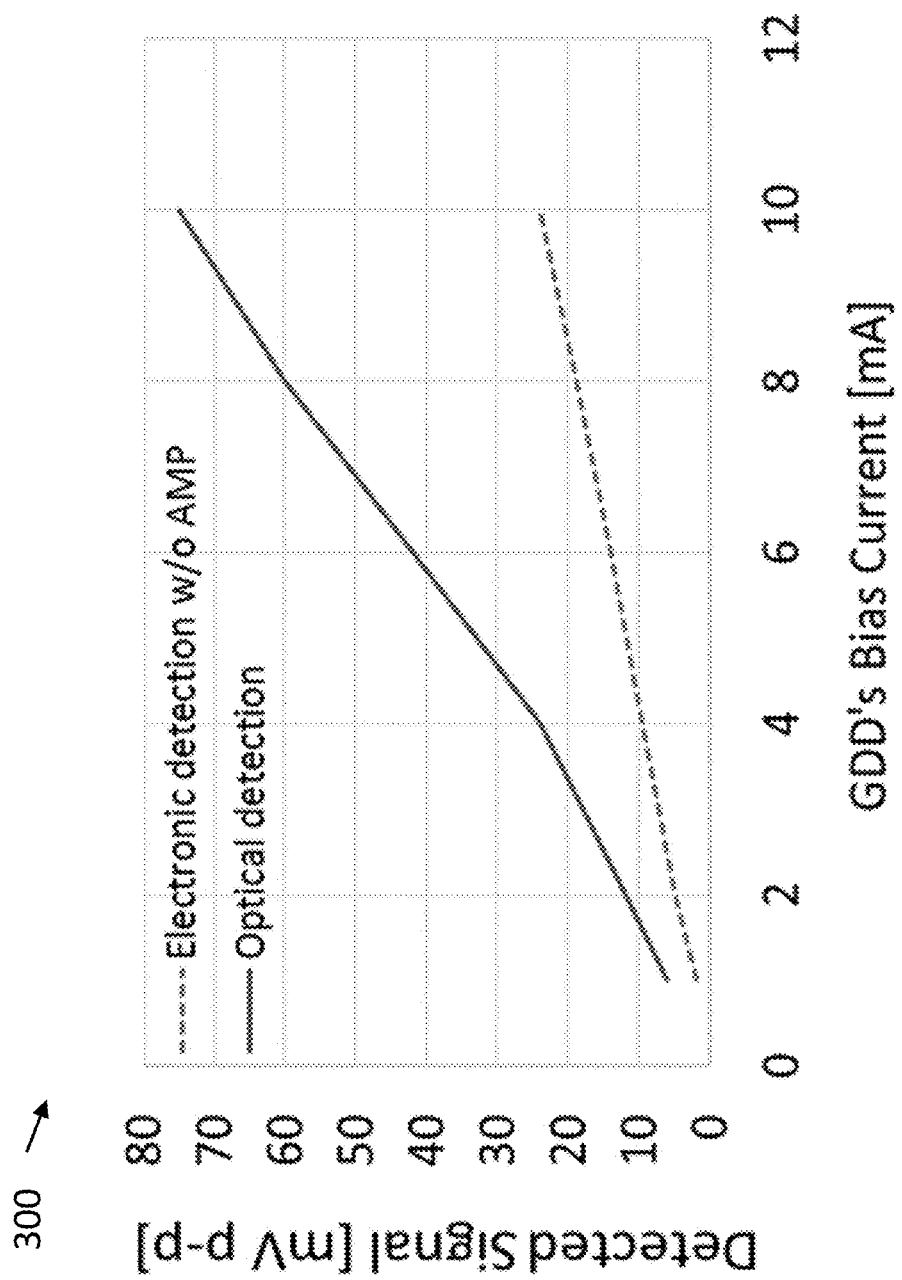
FIG. 3 shows a graph representation of a detected signal from a photodetector and a detected signal from an electronic circuit as a function of glow discharge detector direct current bias current, according to some exemplary embodiments of the subject matter.

Referring to FIG. 3 showing a comparison between the optical detection using the upconversion method and the electronic detection without an amplifier during the experiment. Responsivity of both detection methods, e.g. optical and electrical, may vary according to DC bias current. Furthermore, the higher the DC current of GDD 120, the better the responsivity of upconversion system 100. This may be attributed to an increase of an electron-neutral atom collision frequency with respect to the bias current, thus increasing the MMW/THz radiation absorption via energy transfer to neutral atoms, in which the MMW/THz energy adds to the electron kinetic energy and thereby excites or ionizes neutral atoms. This changes the de-excitation and recombination rates, and therefore the illumination intensity of GDD 120. Consequently, amplitude modulation of the MMW/THz radiation is required in order to distinguish between a signal light and a bias light of GDD 120.

Figure 4:
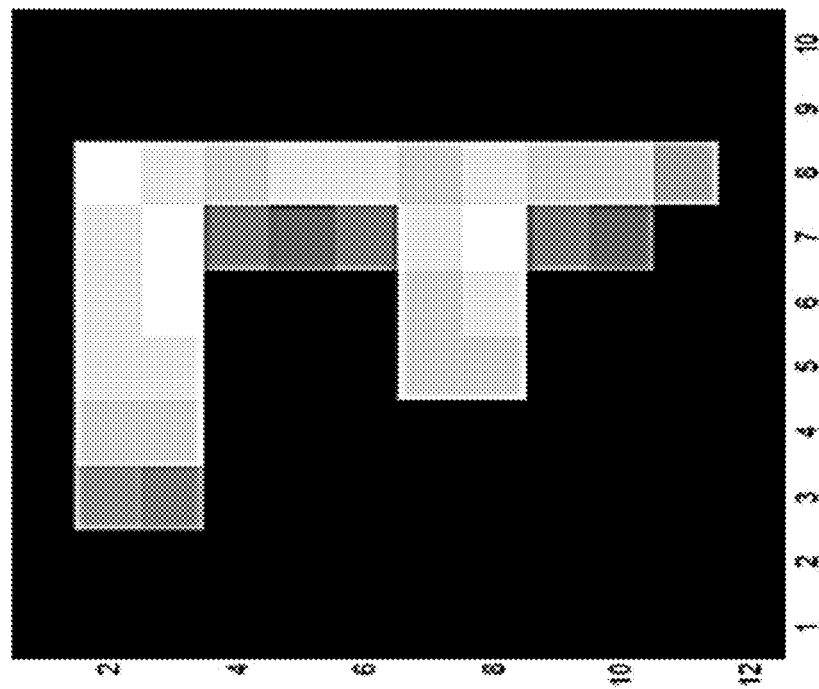
FIG. 4 shows an upconversion imaging result, according to some exemplary embodiments of the subject matter.
Figure 4:
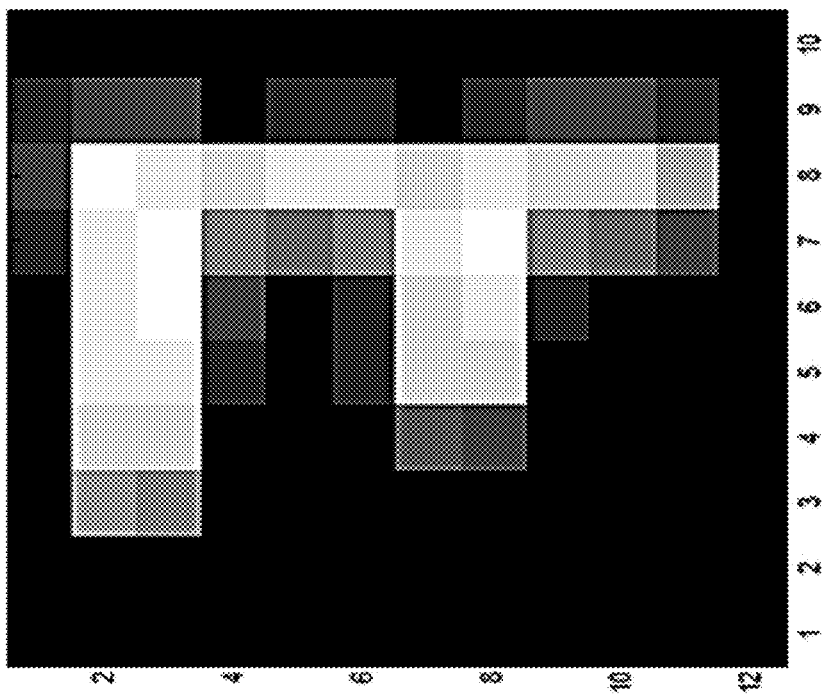

Referring to FIG. 4, showing an upconversion imaging result in the experiment. Object 153 was an "F" shaped metal object. To obtain a scan of object 153, object 153 was shifted one centimeter in each direction, e.g. horizontally and vertically, using a jack and a linear stage. Object 153 is shifted over a range of 1-10 points horizontally and 1-12 points vertically; thus, an image of object 153 was scanned and acquired. The results show a shape of object 153 clearly and in correct dimensions. In order to reduce some low-intensity blur values, image processing was performed to determine a threshold value by trial and error, and zero all the pixels below the threshold value.

Figure 5B:
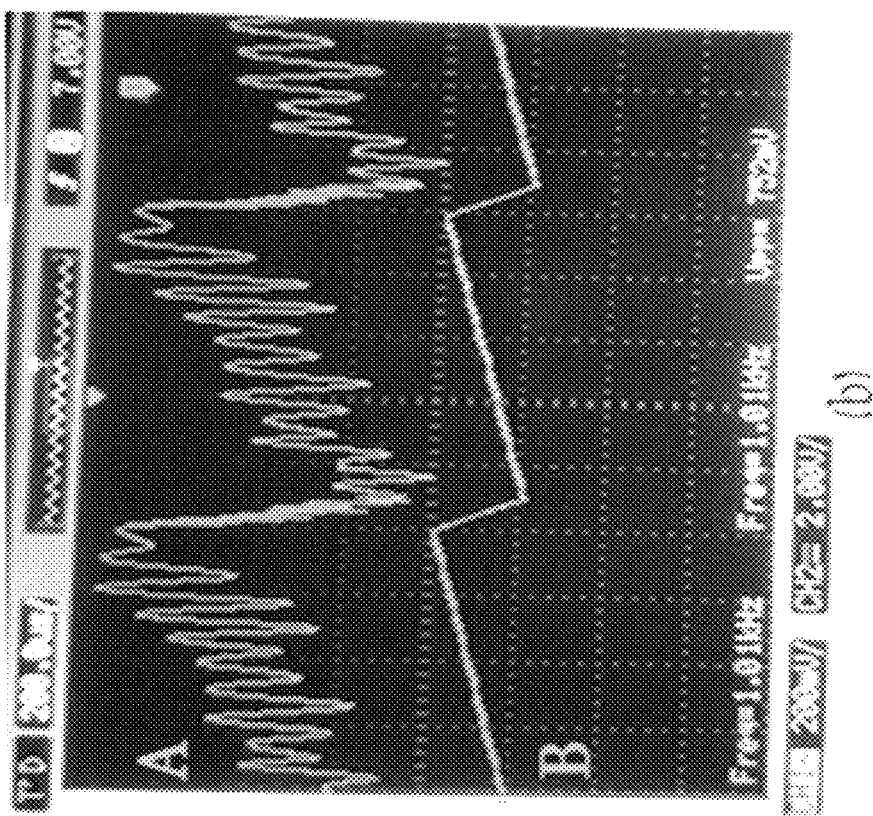
FIG. 5A-5B shows a detected signal for a FMCW experiment using upconversion system.
Figure 5A:
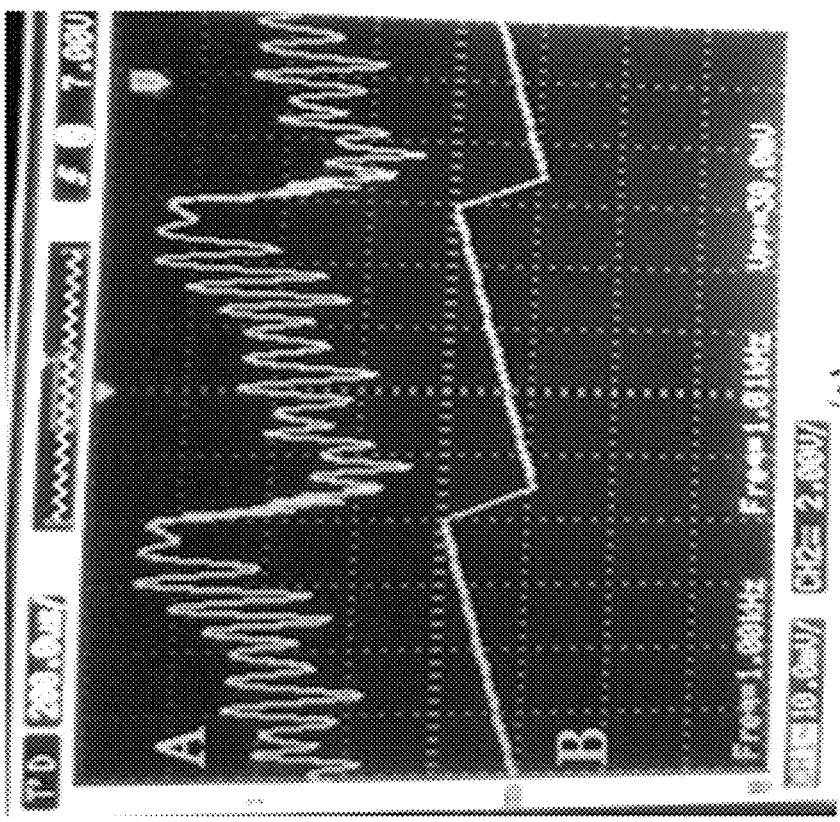

Referring to FIG. 5A-5B, showing a detected signal for a FMCW experiment using upconversion system 100 of FIG. 1C. FIG. 5A shows results of output of photodetector 130. FIG. 5B shows results for an electronic detection from amplifier output connected to the electronic circuit of GDD 120 to show the advantages of output provided from photodetector 130. Signal A represents a detected signal, and signal B represents a saw-tooth modulation signal serving as a trigger. Furthermore, FMCW with miniature neon indicator lamps as GDD mixers works for both electronic heterodyne detection and upconversion optical heterodyne detection. Both detection processes derive from the excitation and resultant ionization collision processes between free electrons and neutral gas atoms. These lead to increased current as well as to de-excitation and recombination which produce GDD light emission.

For the experiment, a GDD bias current was 10 mA, with a square-wave modulation at 1 KHz, and MMW/THz frequency of 100 GHz. The detected signal from photodetector 130 output was measured to be 76 mV. A side configuration of GDD 120 was used instead of a head on configuration. Sensitivity in head on configuration is about an order of magnitude better because plasma interaction depth is then about 1 cm corresponding to electrode length, rather than 1 mm corresponding to electrode thickness.

The raw data of the FMCW signal recorded by an oscilloscope was analyzed using a fast Fourier transform (FFT) which shows the frequency components of the detected signal. FIG. 10 shows the FFT of the detected signal A for the FMCW experiment shown in FIG. 9. FFT was used to isolate the frequency component of the $f_b$ from the detected signal. One can see that the beat frequency for both detection methods is 12.7 KHz according to the FFT. This frequency corresponds to OPD of 1.143 m and is in excellent agreement with the OPD calculation made above and within the boundaries of the expected frequency and OPD resolutions. The other main frequency component shown in the FFT is the modulation signal frequency of about 1 KHz.

The minimum detected signal power of our upconversion system 100 was found to be about 1.3 micro-Watt (µW) (when multiplying the NEP with square root of the photodetector bandwidth) according to Eq. (2). The minimum detectable MMW/THz power density of our upconversion system was found to be on the order of 1 µW/centimeter squared (cm2) (when dividing the minimum detected signal power with the area of the detector).

Figure 2:
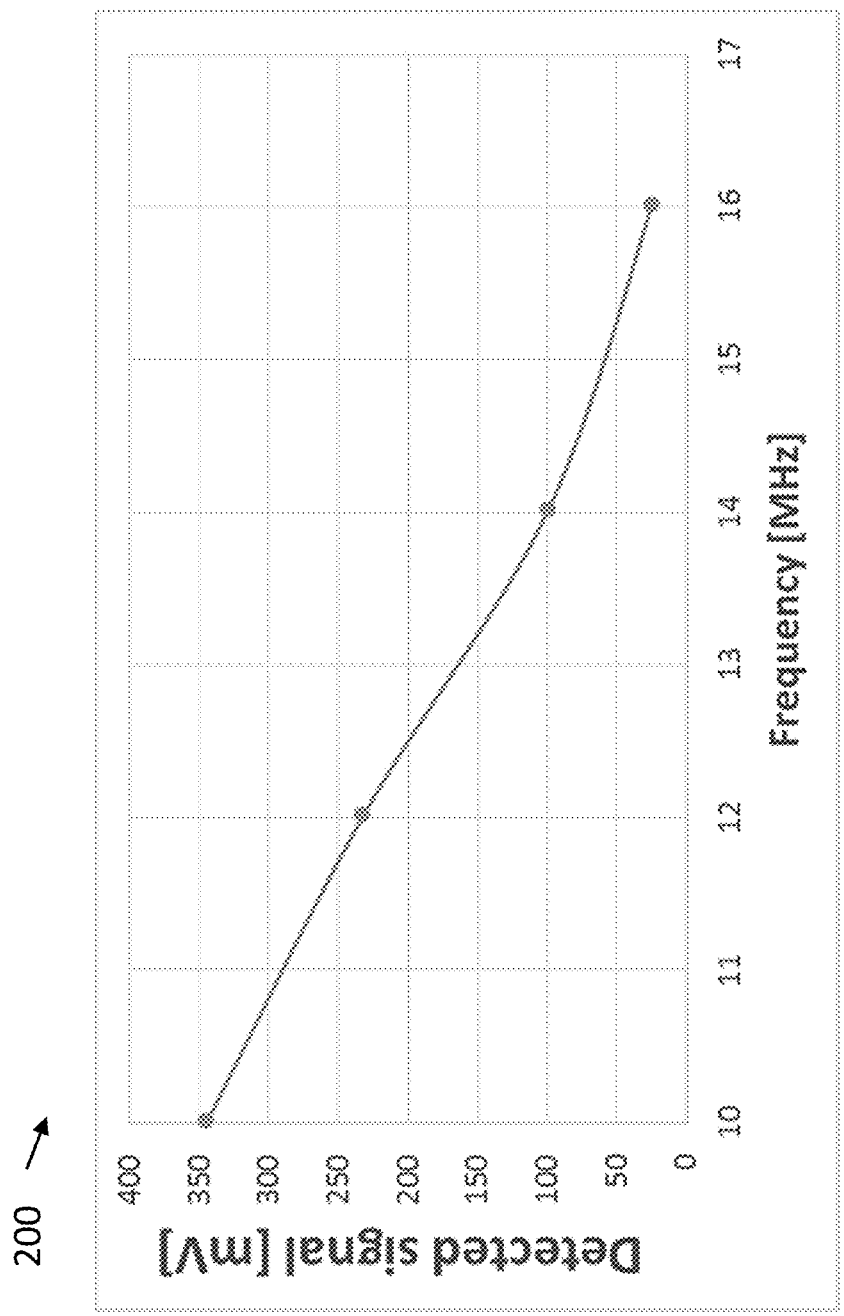
FIG. 2 shows a graph representation of a frequency response of an upconversion, according to some exemplary embodiments of the subject matter.

Referring to FIG. 2, showing a graph representation of a frequency response of an upconversion, according to some exemplary embodiments of the subject matter. Graph 200 shows modulation frequencies up to 16 MHz. A detected signal decreases significantly as frequencies of the detected signal approach a higher value of TIA 191 bandwidth. That is because of the amplifying chain bandwidth rather than GDD 120.

The comparison shows that a noise equivalent power (NEP) using the upconversion is almost an order of magnitude lower than the NEP in the electronic detection, and the responsivity may be three times better than in the electronic detection. In certain embodiments, upconversion system 100 may be configured to increase a data rate via parallel channels of GDD 120. Optionally, coherent modulation methods (like QPSk, QAM, etc.) used with this bandwidth it is possible to modulate tens of mega-bits and more, depending on the modulation method.

The experimental results demonstrate that upconversion system 100 with GDD 120 and photodetector 130 may serve for MMW/THz imaging. The results show improvement of the response time using the presented method compared to the electronic detection of the GDD. The NEP may have an order of magnitude lower than the NEP in the electronic detection of GDD 120, and a responsivity that may be three times better than in the electronic detection.

The various devices and methods discussed in the framework of the experimental results, form embodiments of the present invention.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

The present invention may be a system, a method, and/or a computer program product. The computer program product may include a non-transient computer readable storage medium (or media) having computer readable program instructions thereon for causing a processor (150) to carry out aspects of the present invention. For example, the processor (150) may be operatively coupled to the photodetector (130), to analyze imagery captured by the photodetector (130) and to compute at least one parameter of the signal source radiation based on the imagery. This computation facilitates operation the imaging and/or communication systems discussed above.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An upconversion system, comprising:
    a glow discharge device (GDD) comprising a neon lamp configured to detect a signal source radiation reflected from a target object being irradiated by a radiation source, wherein the signal source radiation is at least one of millimeter wave (MMW) radiation and Terahertz (THz) radiation; and
    a photodetector configured to measure changes in an intensity in visible light emitted by the ODD as a result of an absorption of the signal source radiation,
    wherein the radiation source is configured to modulate a frequency of the signal source radiation over time, such that a difference in the frequency indicates a distance of each pixel of an image of the GDD measured by the photodetector, enabling a construction of a three-dimensional image of the target object.

2. The upconversion system of claim 1, further comprising a beam splitter configured to split the signal source radiation into a signal beam and a reference beam, wherein the signal beam and the reference beam are absorbed by the GDD to generate the visible light.

3. The upconversion system of claim 1, wherein the radiation source is configured to modulate an amplitude of the signal source radiation, to distinguish between visible light resulting from the signal source radiation and visible light resulting from a bias current of the GDD.

4. The upconversion system of claim 1, further comprising a processor operatively coupled to the photodetector, the processor configured to analyze imagery captured by the photodetector, and to compute at least one parameter of the signal source radiation based on the imagery.

5. A method, comprising:
    directing a photodetector towards a glow discharge device (GDD) comprising a neon lamp and configured to detect a signal source radiation reflected from a target object being irradiated by a radiation source, wherein the signal source radiation is at least one of millimeter wave (MVJW) radiation and Terahertz (THz) radiation; and
    operating the photodetector to measure changes in an intensity in visible light emitted by the GDD as a result of an absorption of the signal source radiation,
    wherein the radiation source is configured to modulate a frequency of the signal source radiation over time, such that a difference in the frequency indicates a distance of each pixel of an image of the GDD measured by the photodetector, enabling a construction of a three-dimensional image of the target object.

6. The method of claim 5, further comprising:
    modulating an amplitude of the signal source radiation, to distinguish between visible light resulting from the signal source radiation and visible light resulting from a bias current of the GDD.

7. The method of claim 5, further comprising using a beam splitter to split the signal source radiation into a signal beam and a reference beam, wherein the signal beam and the reference beam are absorbed by the GDD to generate the visible light.

8. The method of claim 5, further comprising:
    providing a processor that is operatively coupled to the photodetector; and
    operating the processor to analyze imagery captured by the photodetector, and to compute at least one parameter of the signal source radiation based on the imagery.

* * * * *